United States Patent
Watanuki

[11] Patent Number: 5,913,550
[45] Date of Patent: Jun. 22, 1999

[54] METHOD FOR FABRICATING MAGNETIC HEAD

[75] Inventor: Motoichi Watanuki, Kawasaki, Japan

[73] Assignee: Fujitsu Limited, Kawasaki, Japan

[21] Appl. No.: 08/743,551

[22] Filed: Nov. 4, 1996

[30] Foreign Application Priority Data

Nov. 9, 1995 [JP] Japan ..................................... 7-290892

[51] Int. Cl.⁶ ............................ G11B 5/127; G11B 5/455
[52] U.S. Cl. .................. 29/603.1; 29/603.15; 29/603.16; 360/113
[58] Field of Search ................................ 29/593, 603.09, 29/603.1, 603.15, 603.16; 73/7; 324/207.15, 207.21, 212; 360/113; 451/5, 6

[56] References Cited

U.S. PATENT DOCUMENTS

| 4,511,942 | 4/1985 | Valstyn | 29/603.1 |
|---|---|---|---|
| 5,023,991 | 6/1991 | Smith | 29/603.09 |
| 5,056,353 | 10/1991 | Matono | 73/7 |
| 5,175,938 | 1/1993 | Smith | 29/603.09 X |
| 5,331,495 | 7/1994 | Yoshida et al. | 29/603.1 X |
| 5,523,539 | 6/1996 | Hoogerwerf et al. | 29/603.1 X |
| 5,612,843 | 3/1997 | Packard | 29/603.1 X |
| 5,722,155 | 3/1998 | Stover et al. | 360/113 X |
| 5,738,566 | 4/1998 | Li et al. | 451/5 X |
| 5,742,995 | 4/1998 | Amin et al. | 29/603.1 |

FOREIGN PATENT DOCUMENTS

| 61-182618 | 8/1986 | Japan . |
|---|---|---|
| 62-12911 | 1/1987 | Japan . |

Primary Examiner—Peter Vo
Attorney, Agent, or Firm—Greer, Burns & Crain, Ltd.

[57] ABSTRACT

In a method for fabricating a magnetic head in which a block is cut from a wafer, and either the element height of a magnetoresistive head or the gap depth of a thin-film magnetic head is machined to a prescribed value, a resistance monitoring pattern for monitoring element height machining, said monitoring pattern comprising a first resistance pattern having a surface area which decreases in a nearly linear manner as machining progresses in the direction that reduces the element height and a second resistance pattern having a surface area which decreases in nearly piecewise linear manner as machining progresses in the direction that reduces the element height, is formed on the wafer block at the time of said wafer process, a determination being made during the machining and based on the resistance value of the resistance monitoring pattern, of the timing of stopping the machining which reduces the element height.

14 Claims, 13 Drawing Sheets

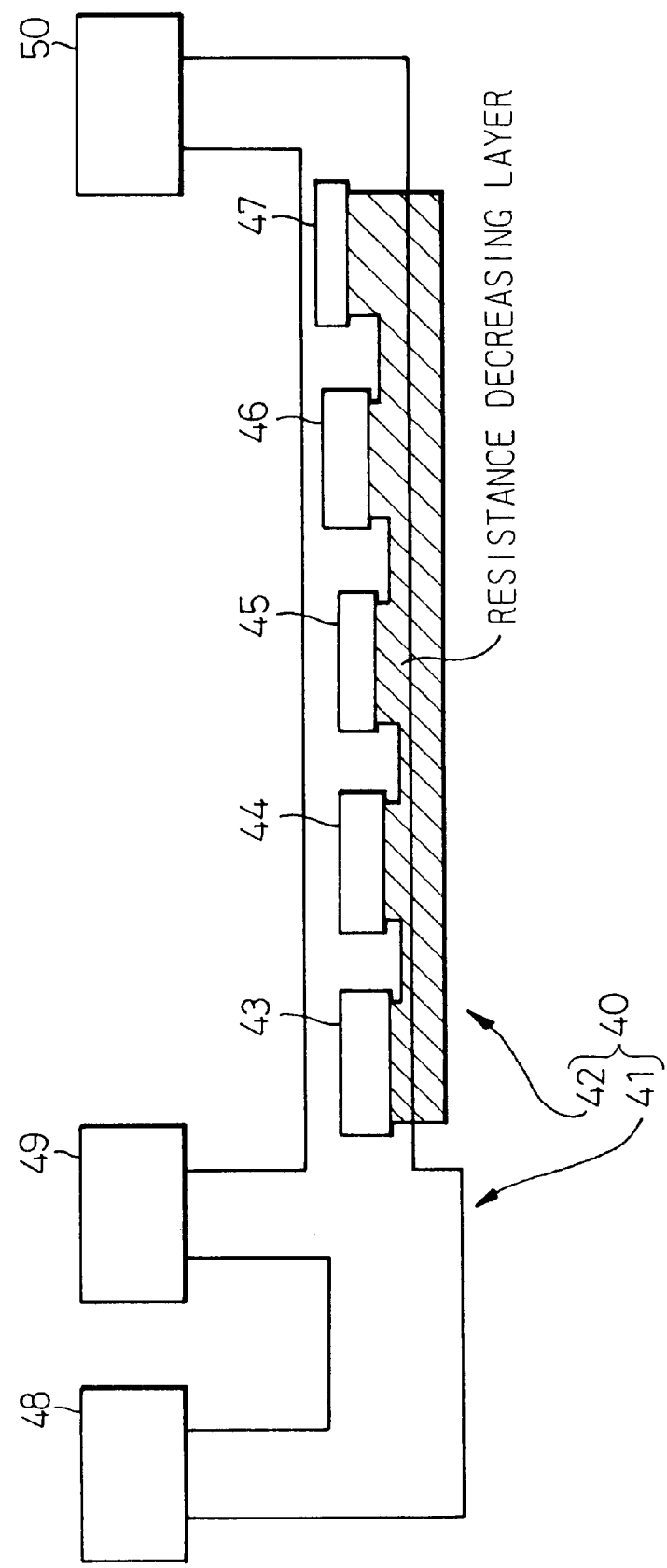

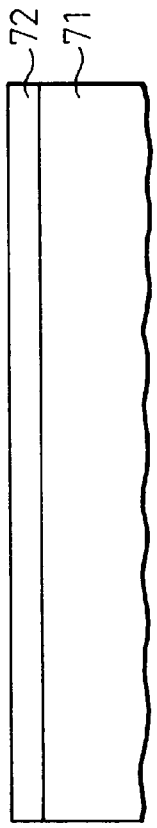
Fig.9A PREPARATION OF SUBSTRATE PROTECTING LAYER
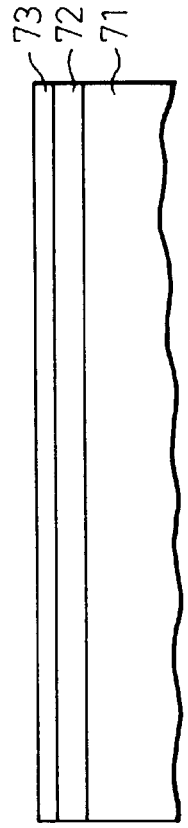
Fig.9B PREPARATION OF LOWER SHIELDING LAYER
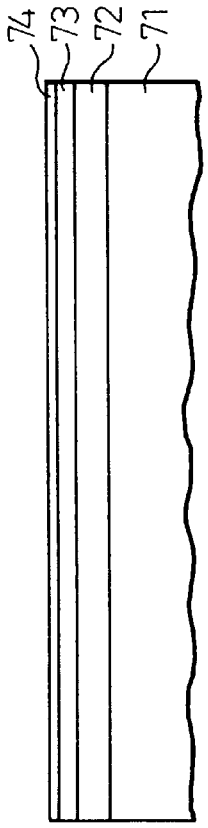
Fig.9C PREPARATION OF INSULATING LAYER
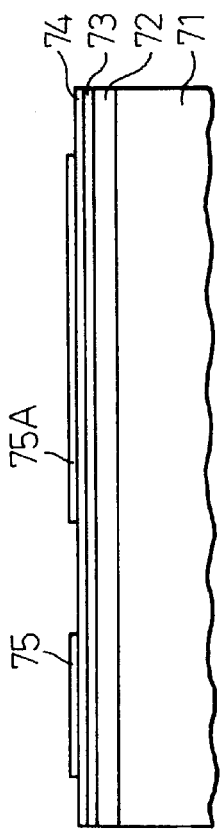
Fig.9D PREPARATION OF MAGNETORESISTIVE DEVICE PORTION (SAL/Ta/MR)

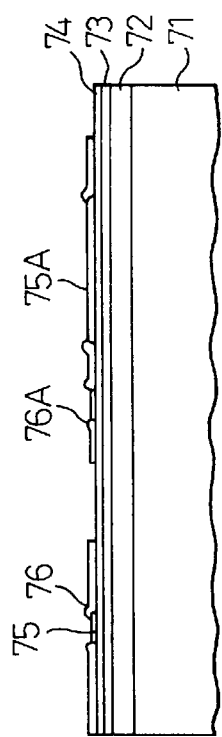
Fig.9E PREPARATION OF TERMINAL LAYER
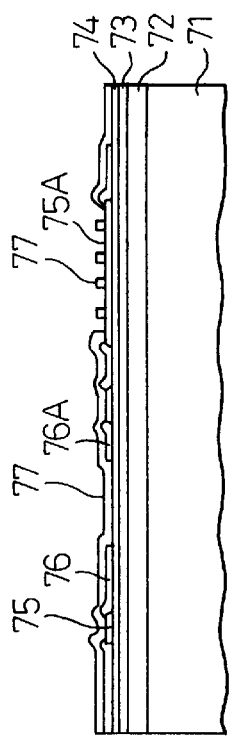
Fig.9F PREPARATION OF INSULATING LAYER
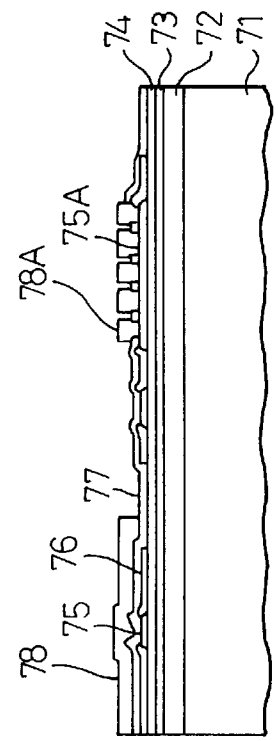
Fig.9G PREPARATION OF UPPER SHIELDING LAYER
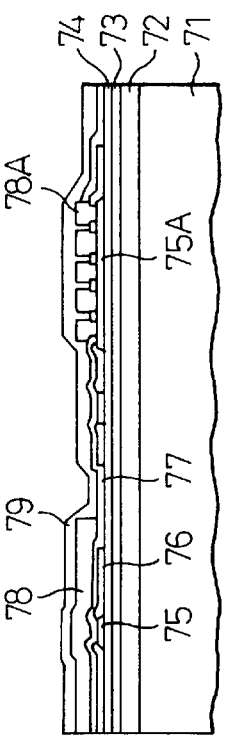
Fig.9H PREPARATION OF THIN FILM HEAD GAP LAYER

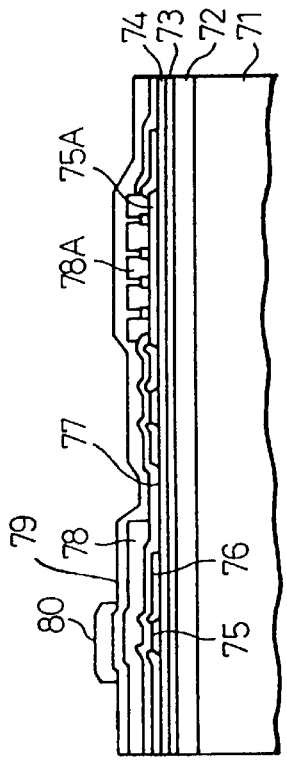
Fig.9I PREPARATION OF UPPER MAGNETIC POLE
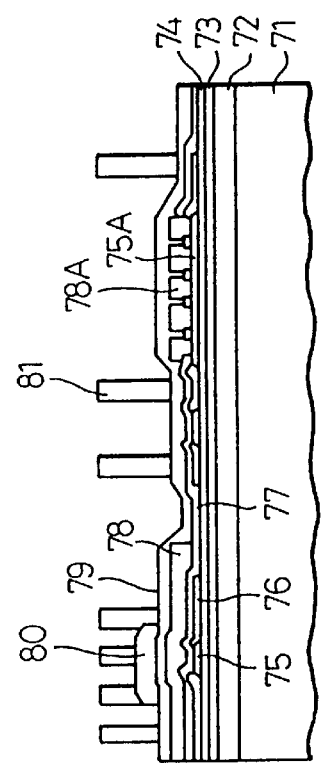
Fig.9J PREPARATION OF TERMINALS
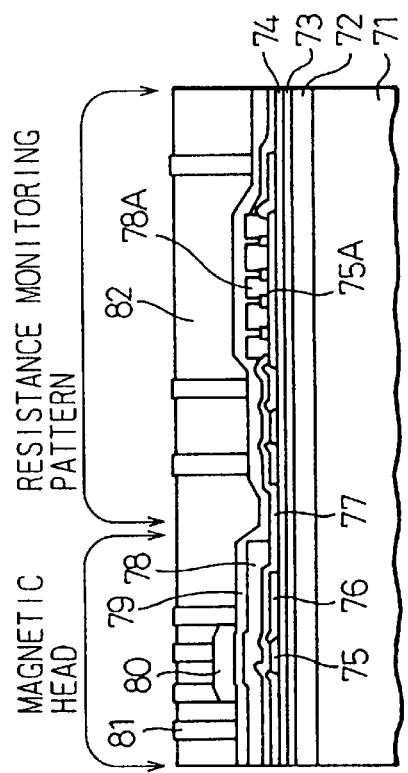
Fig.9K PREPARATION OF PROTECTING LAYER

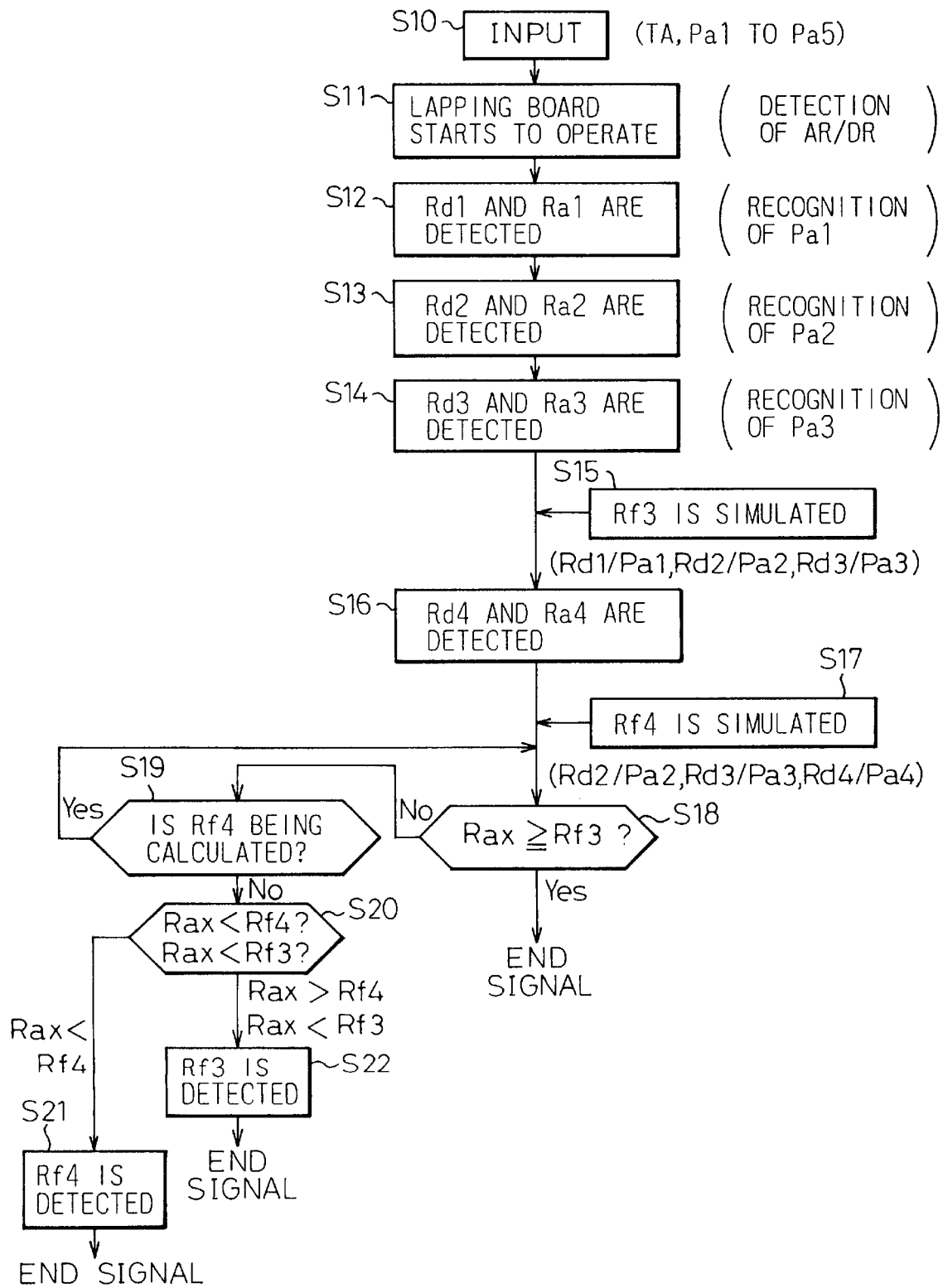

METHOD FOR FABRICATING MAGNETIC HEAD

BACKGROUND OF THE INVENTION

1. Field of the Invention

The present invention relates to a method for fabricating a magnetic head that includes the steps of growing films for a magnetic head which includes at least one of a magnetoresistive head and a thin-film head in a two-dimensional arrangement on a wafer, cutting out of the wafer a block in which a plurality of magnetic heads are arranged in a straight line, machining the element height of the magnetoresistive heads (height of the magnetoresistive head part) or the gap depth of the thin-film heads in units of blocks to a required value, and fabricating individual magnetic heads by dividing the blocks after the above process.

2. Description of Related Art

A known means to provide a reproducing head for high density is that of a magnetoresistive head which uses a magnetoresistive element, the electrical resistance of which changes in response to the strength of a magnetic field. This head is known as a magnetoresistive head (MR head), there being AMR (anisotropic magnetoresistive) heads which make use of the anisotropic magnetoresistive effect, and GMR (giant magnetoresistive) heads which make use of the giant magnetoresistive effect.

An AMR head comprises a soft adjacent layer made of a magnetized magnetic material such as NiFeCr (Nickel-Iron-Chrome), a non-magnetic center Ta (tantalum) layer, a magnetoresistive (MR) layer made of a material such as NiFe (ferrite), a BCS (boundary control stabilization) layer which is substantially magnetized and made of FeMn (Iron-manganese), that is an antiferromagnetic material, and a pair of conductive layers for the purpose of sense current supply which are arranged in parallel on the BCS layer with a spacing that corresponds to the recording track width, these layers being laminated in this sequence to fabricate a magnetoresistive effect element, a magnetic bias being applied to the magnetoresistive layer by means of the BCS layer in the width direction of the recording tracks, with a magnetic bias being applied to the magnetoresistive layer by means of the soft adjacent layer in the direction perpendicular to the BCS layer magnetic bias.

In a GMR head, by making use of the giant magnetoresistive effect, it is possible to achieve a significantly higher density than with an AMR head. The magnetoresistive element part of a GMR head also has a laminated structure in which a plurality of magnetic layers are laminated with an intervening non-magnetic layer, a pair of conductive layers for the purpose of sense current supply which are arrangement in parallel with a spacing that corresponds to the recording track width being mounting to the magnetoresistive element part.

The above-noted magnetoresistive head is capable of only reproducing, and cannot be used for recording. For this reason, it is usually used in combination with a thin-film head which performs recording, forming a compound magnetic head.

FIG. 1 is a drawing which shows the main part of a compound magnetic head, and FIG. 2 is a plan view which shows the magnetoresistive element part and conductive layer in FIG. 1.

In the above-noted drawings, the reference numeral 10 denotes a track on a magnetic recording medium, 20 is a recording head section formed by a thin-film head which performs recording of information onto the magnetic recording medium, and 30 is a reproducing section which is formed by a magnetoresistive head which performs reproduction of information. The recording head section 20 comprises a lower magnetic pole 21 which is made of, for example, NiFe, an upper magnetic pole 22 which is opposed to the lower magnetic pole 21 and which is made of, for example, NiFe, and a coil 23 which excites these magnetic poles 21 and 22, and which causes the recording of information onto the track 10 of the magnetic recording medium. In the space surrounding the coil 23, a non-magnetic insulating layer 24, made of $Al_2O_3$ or the like, is provided so as not to leave any space therebetween.

The reproducing head 30 is formed by an AMR head, a GMR head or the like, and on the magnetoresistive element part 30A thereof, a pair of conducting layers 31 for the purpose of supplying a sense current to the magnetoresistive element part 30A, with a spacing that corresponds to the recording track width.

The laminated condition of the recording head section 20 and the reproducing head section 30 will be described with reference to FIG. 3. FIG. 3 is a cross-sectional view which shows the laminated structure of the region of the gap of the magnetic head as seen from the magnetic recording medium. In FIG. 3, the reference numeral 25 denotes a ceramic substrate, onto which a non-magnetic insulating layer 26 of $Al_2O_3$ or the like, a lower shielding layer 27 of NiFe or the like, and a non-magnetic insulating layer 28 of $Al_2O_3$ or the like are formed, in that sequence, the magnetoresistive element part 30A of the reproducing head 30 being formed on top of this non-magnetic insulating layer 28. If the magnetoresistive element part 30A of the reproducing head 30 were to be formed by an AMR head, a soft adjacent layer, a non-magnetic center layer made of Ta or the like, a magnetoresistive layer made of NiFe or the like, and a BCS layer made of FeMn or the like would be formed in that sequence on the non-magnetic insulating layer 28. On top of this magnetoresistive element part 30A is formed a pair of conductive layers 31 for the purpose of supplying a sense current to the magnetoresistive element part 30A, these layers having a spacing which corresponds to the recording track width.

Additionally, a non-magnetic insulating layer 32 is formed on the magnetoresistive element part 30A and the conductive layer 31, and on top of this is formed a recording head section 20. That is, the lower magnetic pole (lower shielding layer) 21 made of NiFe or the like, the coil 23 (not shown in FIG. 3), the non-magnetic insulating layer 24 made of $Al_2O_3$ or the like, and the upper shielding layer 22 made of NiFe or the like are formed in this sequence. Then finally a protecting layer 33 made of $Al_2O_3$ or the like is formed on the outside of the upper magnetic pole 22 for the purpose of covering the surface of the recording head section 20.

In fabricating a magnetic head having the structure noted above, the process comprises the steps of growing the films, onto a wafer, for many magnetic heads arranged in a two-dimensional arrangement, cutting out of the wafer a block in which a plurality of magnetic heads is arranged in a straight line, machining the element height of the magnetoresistive heads or the gap depth of the thin-film heads in units of blocks to a required value, and fabricating individual magnetic heads by dividing the blocks after the above process.

In doing this, it is necessary that the element height of a magnetoresistive head (the up/down direction width of the magnetoresistive element part 30A in FIG. 3) or the gap depth of a thin-film head (the up/down direction width of the gap part in FIG. 3) be machined by lapping or the like to a precise value, because of the critical effect this has on the characteristics of a magnetic head. This machining is performed in the above-noted steps. A known method of machining the element height of a magnetoresistive head or the gap depth of a thin-film head to be machined to a given value as a block by lapping or the like, is to form a machining reference resistance pattern which decreases as the machining proceeds on the block at the wafer process, and to stop the machining at the point in time at which the resistance value of the machining reference resistance pattern reaches a prescribed value.

However, there is a great deal of variance in the film thickness of the machining reference resistance pattern and the resistivity thereof. With regard to the film thickness in particular, this is not uniform even within one and the same wafer. For this reason, there is the problem that even if the resistance value of the machining reference resistance pattern reaches the prescribed value (target value), it is not possible to machine the element thickness of the magnetoresistive head or the gap depth of a thin-film head to a given value, and in the method of fabricating a magnetic head having a structure as noted above, making it impossible to achieve precise machining of the element height in a magnetoresistive head or the gap depth in a thin-film head.

As a solution to the above-noted problem, it is possible to envision the setting of a target resistance value for each block individually (the block being the unit for machining, also known as the workpiece). This is not realistic, however, and does not allow automation of the process. There is also the method of not measuring the resistance value, but rather directly measuring the shape of the pattern, and stopping the machining at the point at which a dimension thereof reaching a prescribed value. However, in that fabrication method, it is necessary to stop the process a number of times as machining proceeds for the purpose of measuring the shape of the pattern, this process being accompanied by the risk of removing excessive material, not only making it difficult to actually achieve highly precise machining, but also preventing automation of the process.

SUMMARY OF THE INVENTION

In consideration of the above-noted problems in the related art, an object of the present invention is to provide a fabrication method for a magnetic head that not only enables precise machining of the element thickness of a magnetoresistive head or the gap depth of a thin-film head to a prescribed value without being influenced by a variation in the film thickness of a resistance pattern or the resisitivity thereof, but which also can be automated.

The present invention, which is related to a method which solves the above-noted problems for fabricating a magnetic head which includes a magnetoresistive head, has a wafer process in which magnetic heads, at least including a magnetoresistive head, are formed on a wafer in a two-dimensional arrangement, a cutting processing in which a block having a plurality of magnetic heads arranged in a straight line thereon is cut from the wafer, a machining process whereby the magnetoresistive element part of the above-noted magnetoresistive heads is machined to a prescribed height value in a unit of a block, and a division process whereby individual magnetic heads are fabricated by division from the above-noted block after the above-noted processing, a resistance monitoring pattern for monitoring of element height machining comprising a first resistance pattern, the surface area of which decreases nearly linearly as machining proceeds in the direction that reduces the element height of the magnetoresistive head, and a second resistance pattern, the surface area of which decreases nearly in a piecewise linear manner as machining proceeds in the direction that reduces the element height of the magnetoresistive head, being formed on the wafer block at the time of the above-noted wafer process, the timing of the completion of machining which reduces the element height in the above-noted machining process being determined based on the resistance value of this resistance monitoring pattern.

According to the present invention, as machining in the direction which reduces the element height of the magnetoresistive head proceeds, the surface area of the first resistance pattern decreases nearly linearly, while the surface area of the second resistance pattern decreases nearly in a piecewise linear manner. With the position at which the change in the surface area of the second resistance pattern exhibits a breakpoint being known, whether or not the machining has reached that position can be easily and accurately known by detecting the generation of a breakpoint in the change of the resistance value, because the breakpoint in surface area appears as a breakpoint in the change in resistance value.

Thus, by relating the occurrence of a breakpoint in the change in resistance value of the second resistance pattern with the resistance value of the first resistance pattern at the time that breakpoint occurs, it is possible to establish the timing of the ending of the machining that reduces the element height based on the resistance value of the first resistance pattern. By doing this, it is possible not only to precisely machine the element height of the magnetoresistive head to a prescribed value free from the influence of variation in film thickness and resistivity of the resistance pattern, but also to enable automation of the process.

As an example of a method of determining the timing of stopping the machining, there is the method of determining the resistance value of the first resistance pattern at time of occurrence of a breakpoint in the change in resistance value of the second resistance pattern for at least a plurality of breakpoints, the relationship between the machining position of the element height of the magnetoresistive head and the resistance value of the first resistance pattern being predicted from this plurality of resistance value points, and the timing of the stopping of machining being established from this relationship.

More specifically, the first resistance pattern resistance value at the time of occurrence of a breakpoint in the change of the resistance value of the second resistance pattern is determined at at least three breakpoints, the resistance value at these three breakpoints being used to predict the second-order curve of the relationship between the machining position of the element height of the magnetoresistive head and the resistance value of the first resistance pattern, the resistance value of the first resistance pattern at the target element height being calculated based on the thus predicted second-order curve, the machining which reduces the element height being stopped almost simultaneously with the timing in which the actually measured resistance value of the first resistance pattern reaches this calculated resistance value. This method is desirable from the standpoint of achieving highly precise machining.

The present invention, which is related to a method which solves the above-noted problems for fabricating a magnetic head which includes a thin-film head, has a wafer process in which magnetic heads, at least including a thin-film head, are formed on a wafer in a two-dimensional arrangement, a cutting processing in which a block having a plurality of magnetic heads arranged in a straight line thereon is cut from the wafer, a machining process whereby the gap part of the above-noted thin-film heads is machined to a prescribed depth value in a unit of a block, and a division process whereby individual magnetic heads are fabricated by division from the above-noted block after the above-noted processing, a resistance pattern for monitoring gap depth machining comprising a first resistance pattern, the surface area of which decreases nearly linearly as machining proceeds in the direction that reduces the gap depth of the above-noted thin-film head, and a second resistance pattern, the surface area of which decreases nearly in a piecewise linear manner as machining proceeds in the direction that reduces the element height of the magnetoresistive head, being formed on the wafer block at the time of the above-noted wafer process, the timing of the completion of machining which reduces the gap depth in the above-noted machining process being determined based on the resistance value of this resistance monitoring pattern.

According to the present invention, as machining in the direction which reduces the gap depth of the thin-film head proceeds, the surface area of the first resistance pattern decreases nearly linearly, while the surface area of the second resistance pattern decreases nearly in a piecewise linear manner. With the position at which the change in the surface area of the second resistance pattern exhibits a breakpoint being known, whether or not the machining has reached that position can be easily and accurately known by detecting the generation of a breakpoint in the change of the resistance value, because the breakpoint in surface area appears as a breakpoint in the change in resistance value.

Thus, by relating the occurrence of a breakpoint in the change in resistance value of the second resistance pattern with the resistance value of the first resistance pattern at the time that breakpoint occurs, it is possible to establish the timing of the ending of the machining that reduces the gap depth based on the resistance value of the first resistance pattern. By doing this, it is possible not only to precisely machine the gap depth of the thin-film head to a prescribed value free from the influence of variation in film thickness and resistivity of the resistance pattern, but also to enable automation of the process.

As an example of a method of determining the timing of stopping the machining, there is the method of determining the resistance value of the first resistance pattern at time of occurrence of a breakpoint in the change in resistance value of the second resistance pattern for at least a plurality of breakpoints, the relationship between the machining position of the element height of the magnetoresistive head and the resistance value of the first resistance pattern being predicted from this plurality of resistance value points, and the timing of the stopping of machining being established from this relationship.

More specifically, the first resistance pattern resistance value at the time of occurrence of a breakpoint in the change of the resistance value of the second resistance pattern is determined at at least three breakpoints, the resistance value at these three breakpoints being used to predict the second-order curve of the relationship between the machining position of the gap depth of the thin-film head and the resistance value of the first resistance pattern, the resistance value of the first resistance pattern at the target gap depth being calculated based on the thus predicted second-order curve, the machining which reduces the gap depth being stopped almost simultaneously with the timing in which the actually measured resistance value of the first resistance pattern reaches this calculated resistance value. This method is desirable from the standpoint of achieving highly precise machining.

Another form of the present invention, which is related to a method which solves the above-noted problems for fabricating a magnetic head which includes a magnetoresistive head, has a wafer process in which magnetic heads, at least including a magnetoresistive head, are formed on a wafer in a two-dimensional arrangement, a cutting processing in which a block having a plurality of magnetic heads arranged in a straight line thereon is cut from the wafer, a machining process whereby the magnetoresistive element part of the above-noted magnetoresistive heads is machined to a prescribed height value in a unit of a block, and a division process whereby individual magnetic heads are fabricated by division from the above-noted block after the above-noted processing, a resistance monitoring pattern for monitoring element height machining comprising a resistance pattern having a surface area of which decreases in a nearly piecewise linear manner as machining proceeds in the direction that reduces the element height of the magnetoresistive head being formed on the wafer block at the time of the above-noted wafer process, after which a determination is made of the machining speed in a machining region before the point at which the target value of height of the above-noted magnetoresistive head is reached within a machining region that is delineated by the machining position at which the resistance value of the above-noted resistance pattern exhibits a breakpoint, the time required to reach the target element height being calculated from this machining speed, and machining which reduces the element height being stopped almost simultaneously with the passage of the above-noted amount of time.

According to this form of the present invention, as machining in the direction which reduces the element height of the magnetoresistive head proceeds, the surface area of the resistance pattern decreases in a nearly piecewise linear manner. With the position at which the change in the surface area of the resistance pattern exhibits a breakpoint being known, whether or not the machining has reached that position can be easily and accurately known by detecting the generation of a breakpoint in the change of the resistance value, because the breakpoint in surface area appears as a breakpoint in the change in resistance value.

Thus, the machining speed in a machining region before the point at which the target value of magnetoresistive element height is reached within a machining region that is delineated by the machining position at which the resistance value of the above-noted resistance pattern exhibits a breakpoint is determined, and from this speed the amount of time required to reach the target element height is calculated. By doing this, it is possible not only to precisely machine the element height of the magnetoresistive head to a prescribed value free from the influence of variation in film thickness and resistivity of the resistance pattern, but also to enable automation of the process.

Another form of the present invention which is related to a method which solves the above-noted problems for fabricating a magnetic head, which includes a thin-film head, has a wafer process in which magnetic heads, at least including a thin-film head, are formed on a wafer in a two-dimensional arrangement, a cutting processing in which a block having a plurality of magnetic heads arranged in a straight line thereon is cut from the wafer, a machining process whereby the gap depth part of the above-noted magnetoresistive heads is machined to a prescribed value in a unit of a block, and a division process whereby individual magnetic heads are fabricated by division from the above-noted block after the above-noted processing, a resistance monitoring pattern for monitoring gap depth machining comprising a resistance pattern having a surface area of which decreases in a nearly piecewise linear manner as machining proceeds in the direction that reduces the gap depth of the thin-film head being formed on the wafer block at the time of the above-noted wafer process, after which a determination is made of the machining speed in a machining region before the point at which the target value of gap depth of the above-noted thin-film head is reached within a machining region that is delineated by the machining position at which the resistance value of the above-noted resistance pattern exhibits a breakpoint, the time required to reach the target gap depth being calculated from this machining speed, and machining which reduces the element height being stopped almost simultaneously with the passage of the above-noted amount of time.

According to this form of the present invention, as machining in the direction which reduces the gap depth of the thin-film head proceeds, the surface area of the resistance pattern decreases in a nearly piecewise linear manner. With the position at which the change in the surface area of the resistance pattern exhibits a breakpoint being known, whether or not the machining has reached that position can be easily and accurately known by detecting the generation of a breakpoint in the change of the resistance value, because the breakpoint in surface area appears as a breakpoint in the change in resistance value.

Thus, the machining speed in a machining region before the point at which the target value of thin-film head gap depth is reached within a machining region that is delineated by the machining position at which the resistance value of the above-noted resistance pattern exhibits a breakpoint is determined, and from this speed the amount of time required to reach the target gap depth is calculated. By doing this, it is possible not only to precisely machine the gap depth of the thin-film head to a prescribed value free from the influence of variation in film thickness and resistivity of the resistance pattern, but also to enable automation of the process.

A magnetic head according to the present invention as variously described above is often a compound recording/reproducing magnetic head in which a thin-film recording head is laminated onto a reproducing magnetoresistive head. From the standpoint of machining accuracy, it is desirable that the above-noted resistance pattern be provided at both ends of the block and in the center portion thereof.

BRIEF DESCRIPTION OF THE DRAWINGS

The above-noted object and features of the present invention will be more apparent from the following description of the preferred embodiments, with reference being made to the accompanying drawings, wherein:

FIG. 8 is a drawing which shows another lower resistance layer pattern;

FIG. 9A through FIG. 9K are drawings which show the magnetic head fabricating process according to the present invention;

FIG. 10 is a flowchart which shows the procedure of determining the timing of stopping the machining in the direction that decreases the element height of the magnetic head according to the present invention;

DESCRIPTION OF THE PREFERRED EMBODIMENTS

The preferred embodiments of the present invention will now be described in detail, with reference to the accompanying drawings (FIGS. 4 through 15).

A preferred embodiment of the present invention has the following process steps <1> through <4>.

<1> Wafer process: the formation of the films for magnetic heads, which includes either a magnetoresistive head or a thin-film head, in a two-dimensional arrangement.

<2> Cutting process: the cutting of a block, on which are arranged in a straight line a plurality of magnetic heads, from the wafer.

<3> Machining process: the machining, in a unit of a block, to a prescribed value of element height of a magnetoresistive head or gap depth of a thin-film head.

<4> Division process: the division of the block after the machining process, into individual magnetic heads.

Figure 5:
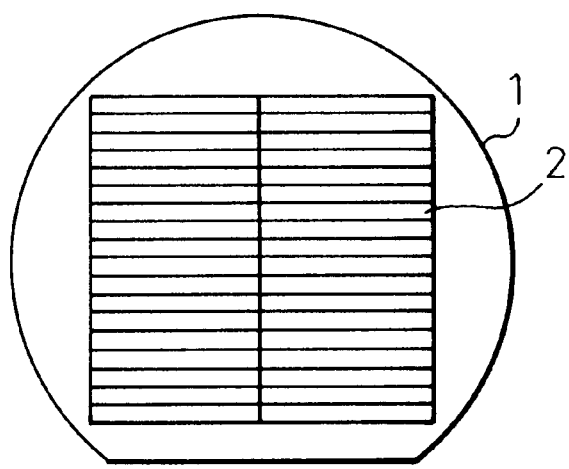
FIG. 5 is a drawing which shows a wafer after growing the magnetic head film.

Turning now to the specifics of each process step, the wafer 1 is nearly round in shape as shown, for example, in FIG. 5, and in the above-noted wafer process step a film is grown to form magnetic heads in a two-dimensional pattern on the surface thereof (these comprising magnetoresistive heads and/or thin-film heads).

After the growth of magnetic head film onto this wafer 1, at the cutting process step a plurality of blocks are cut from the wafer 1. In the example shown in FIG. 5, there are many blocks 2 formed in two rows, the blocks being cut apart along these delineated regions boundaries.

Figure 6:
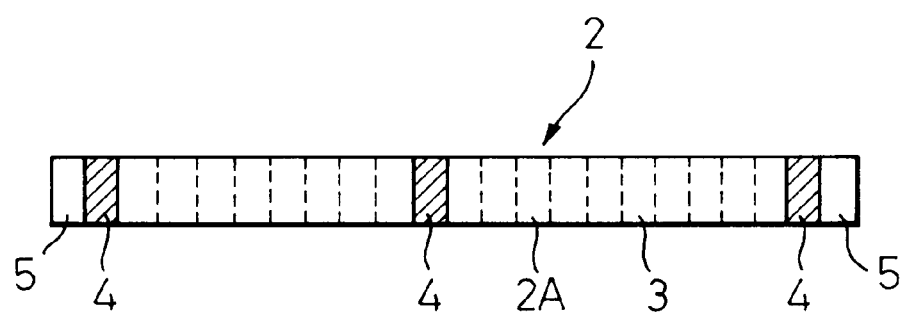
FIG. 6 is a drawing which shows the shape of a block.

Each block 2, as shown for example in FIG. 6 has magnetic heads 3 arranged in a straight line, and in this example a resistance monitoring pattern 4, for monitoring machining, is provided at both ends and at the center part of the block 2. The element height direction of a magnetoresistive head or the gap depth direction of a thin-film magnetic head would be the upward direction in FIG. 6. In the case in which the block 2 is finished by means of lapping, the machined surface is the bottom surface 2A of block 2 as shown in FIG. 6.

Lapping is a type of precision machining in which, by supplying an ultra-fine lapping compound such as diamond slurry between the workpiece and a lapping board (tool), the workpiece and lapping board are caused to move relative to one another as an appropriate pressure is applied therebetween, the cutting edges of the lapping compound grind the workpiece by a minute amount at a time, so that the surface of the workpiece is lapped to a smooth precise surface.

In the case of lapping the block 2 to machine it, it is desirable that pressure be applied to the block 2 as independent control of lapping pressure is performed at a total of three locations, at both ends and the center of the block 2, based on the resistance value of the resistance monitor pattern provided for monitoring the machining.

A machining marker 5 is provided on the outside of the resistance monitoring pattern 4. This machining marker 5 is used in the pre-machining before precision machining using the resistance monitoring pattern 4. After the machine process, each of the blocks 2 is divided into individual magnetic heads at the division process step.

The resistance monitoring pattern used in the present invention for monitoring machining will now be described.

Figure 1:
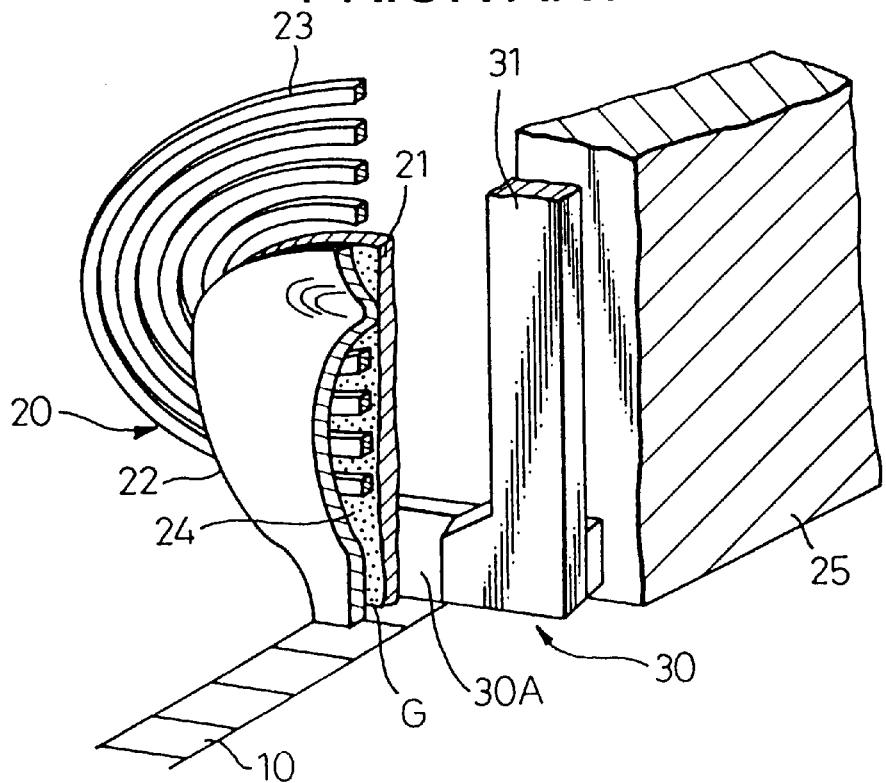
FIG. 1 is a drawing which shows the main part of a general type of compound magnetic head.
Figure 2:
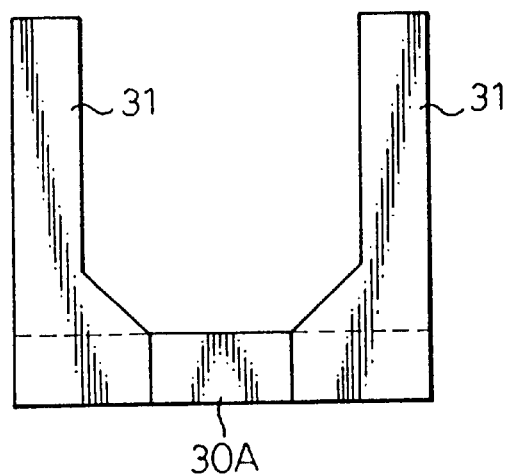
FIG. 2 is a plan view which shows the magnetoresistive element section and conducting layer of FIG. 1.
Figure 3:
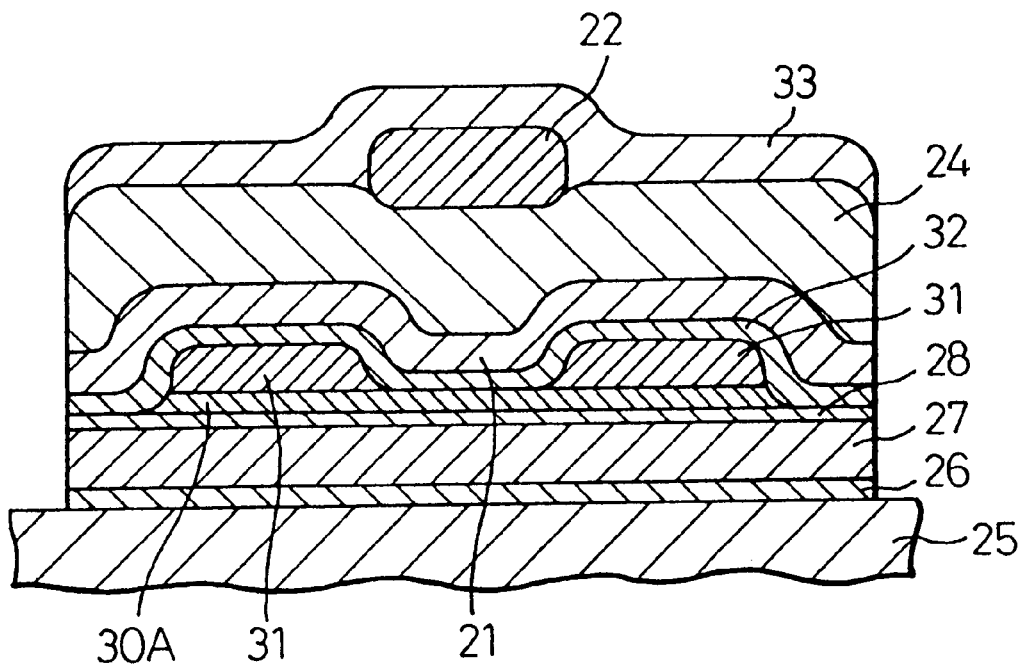
FIG. 3 is a cross-sectional view which shows the lamination condition of the gap region as seen from the magnetic recording medium in FIG. 1.
Figure 4:
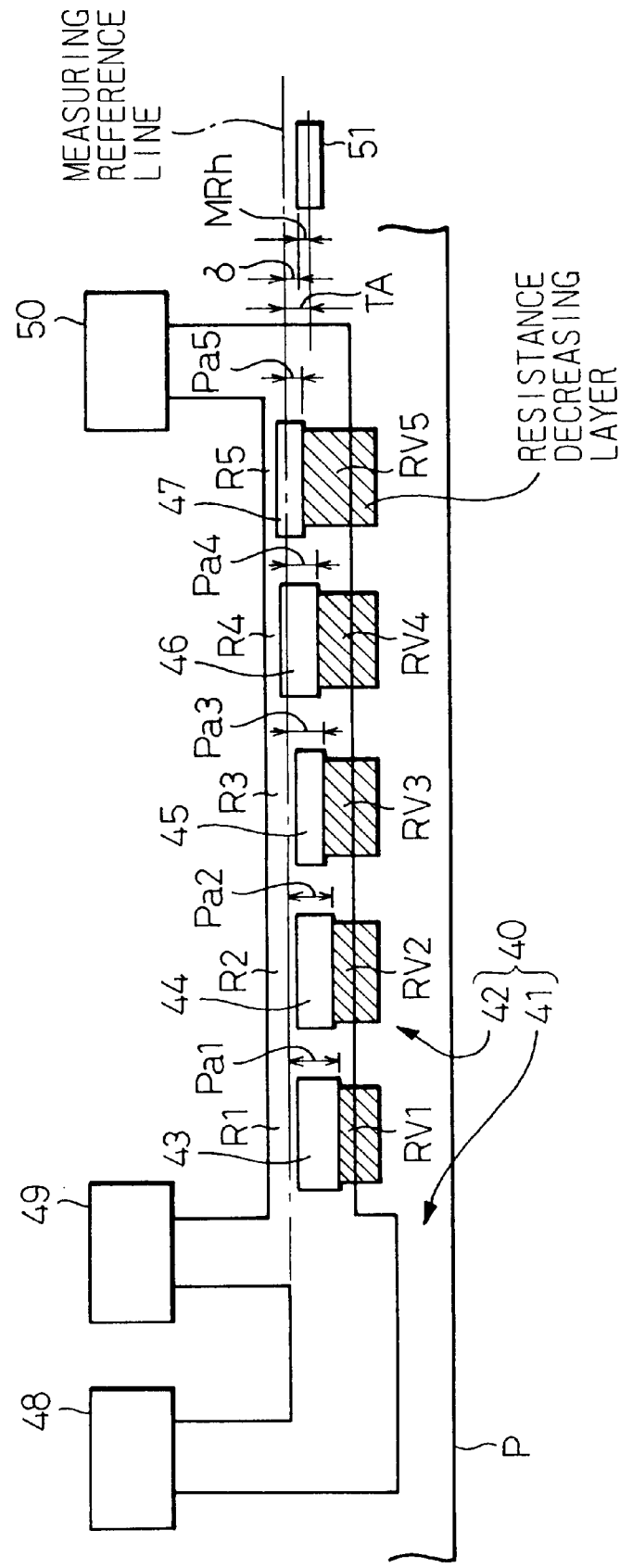
FIG. 4 is a drawing which shows an example of a resistance monitoring pattern used in the present invention.

FIG. 4 is a drawing which shows an example of a resistance monitoring pattern used in the present invention, this being the example of a resistance monitoring pattern that is formed by a first resistance pattern having a surface area which decreases nearly linearly as machining progresses, and a second resistance pattern having a surface area which decreases in nearly piecewise linear manner as machining progresses.

In FIG. 4, the resistance monitoring pattern 40 is formed by the first resistance pattern 41 and the second resistance pattern 42, The first resistance pattern 41 is nearly rectangular in outer shape and has a surface area that decreases nearly linearly as machining progresses from the lapping surface P direction. The second resistance pattern 42 is also nearly rectangular in outer shape but it has a rectangular window-like void on its inside (a part in which the resistive pattern is not formed, this being the five parts 43 through 47 in this example).

The spacings between the frame part of the void windows 43, 44, 45, 46, and 47 on the lapping surface P side (the window sides, these being the positions at which a breakpoint occurs) and the measuring reference line (in this example, the top edge of the first resistance pattern 41) are Pa=Pa1, Pa2, Pa3, Pa4, Pa5 and, as shown in FIG. 4, this decreases in size in this sequence. For this reason, as the machining progress from the lapping surface P direction, the surface area of the second resistance pattern 42 decreases nearly linearly. The breakpoints in the change of surface area occur as the amount of machined material reaches the frame parts of the lapping surface side windows 43, 44, 45, 46, and 47.

The resistance value of the first resistance pattern 41 (hereinafter referred to as the analog resistance value, sometimes abbreviated to "AR") is measured between the terminals 48 and 49, and resistance value of the second resistance pattern 42 (hereinafter referred to as the digital resistance value, sometimes abbreviated to "DR") is measured between the terminals 49 and 50. The resistance values of the resistance patterns 41 and 42 are inversely proportional to the surface areas of the resistance patterns 41 and 42, respectively. Therefore, in the case of the second resistance pattern 42, which has a surface area breakpoint, a breakpoint also appears in the change in the digital resistance value.

Next, the change in the digital resistance value will be described in detail. First, if we look at the void window 43, letting R1 be the resistance value of the resistance pattern immediately below the window 43 and letting RV1 be the resistance value of the resistance pattern at the very top of the window, the top/bottom part resistance value of the window 43, which is the combination of the resistance pattern at the very top of the window 43 (the opposite side of the lapping surface P as seen from the window 43) and the resistance pattern at the very bottom part (lapping surface P side), which is the combined resistance value of R1 and RV1. In this case, because the resistance pattern immediately above the window 43 and the resistance pattern at the very top of the window 43 are electrically connected in parallel, the top/bottom part resistance value of the window 43 corresponds to the parallel connection of the resistance value R1 and the resistance value RV1, which is $(R1 \cdot RV1)/(R1+RV1)$.

As machining progresses, RV1 decreases and, when the machining reaches the frame part of the window 43 on the lapping surface P side (this being the point at which the spacing between the breakpoint position and the measuring reference line is Pa=Pa1), because all of the resistance pattern at the very bottom part of the window 43 is lapped away, RV1 becomes zero. For this reason, the resistance value R at the top/bottom part of the window 43 at this time is simply R1. This resistance value is maintained thereafter at R1 by the existence of the window 43, regardless of the stage of progression of the machining. Therefore, the resistance at the top/bottom part of the window 43 changes from the rapidly increasing condition to a constant value, this being the occurrence of the breakpoint.

The condition is the similar for the windows 44, 45, 46, and 47. That is, if the resistance values of the resistance pattern at the very top parts of the windows 44, 45, 46, and 47 are R2, R3, R4, and R5, and the resistance values of the resistance pattern at the very bottom parts of the windows 44, 45, 46, and 47 are RV2, RV3, RV4, and RV5, the top/bottom part resistance values for the windows 44, 45, 46, and 47 are each $(R2 \cdot RV2)/(R2+RV2)$, $(R3 \cdot RV3)/(R3+RV3)$, $(R4 \cdot RV4)/(R4+RV4)$, and $(R5 \cdot RV5)/(R5+RV5)$, respectively.

However, as machining progresses, RV2, RV3, RV4, and RV5 decrease and, when the machining reaches the frame part of the windows 44, 45, 46, and 47 on the lapping surface P side (these being the points at which the spacing between the breakpoint position and the measuring reference line is Pa=Pa2, Pa3, Pa4, and Pa5, respectively), because all of the resistance patterns at the very bottom part of the windows 44, 45, 46, and 47 are lapped away, the resistance values at the top/bottom part of the window 43 at this time are simply R2, R3, R4, and R5. This resistance value is maintained thereafter at R1 by the existence of the window 43, regardless of the stage of progression of the machining. Therefore, the resistance at the top/bottom part of the windows 44, 45, 46, and 47 change from the rapidly increasing condition to constant values, these points being the occurrence of the breakpoints.

The second resistance pattern 42 is connected in series with the top/bottom part (resistance) of the windows 43, 44, 45, 46, and 47. For this reason, as the machining progresses to the frame part on the lapping surface P side of the windows 43, 44, 45, 46, and 47, so that the spacing Pa reaches the values of Pa1, Pa2, Pa3, Pa4, and Pa5, respectively, a breakpoint occurs in the change of the digital resistance value measured between terminals 49 and 50.

Figure 7:
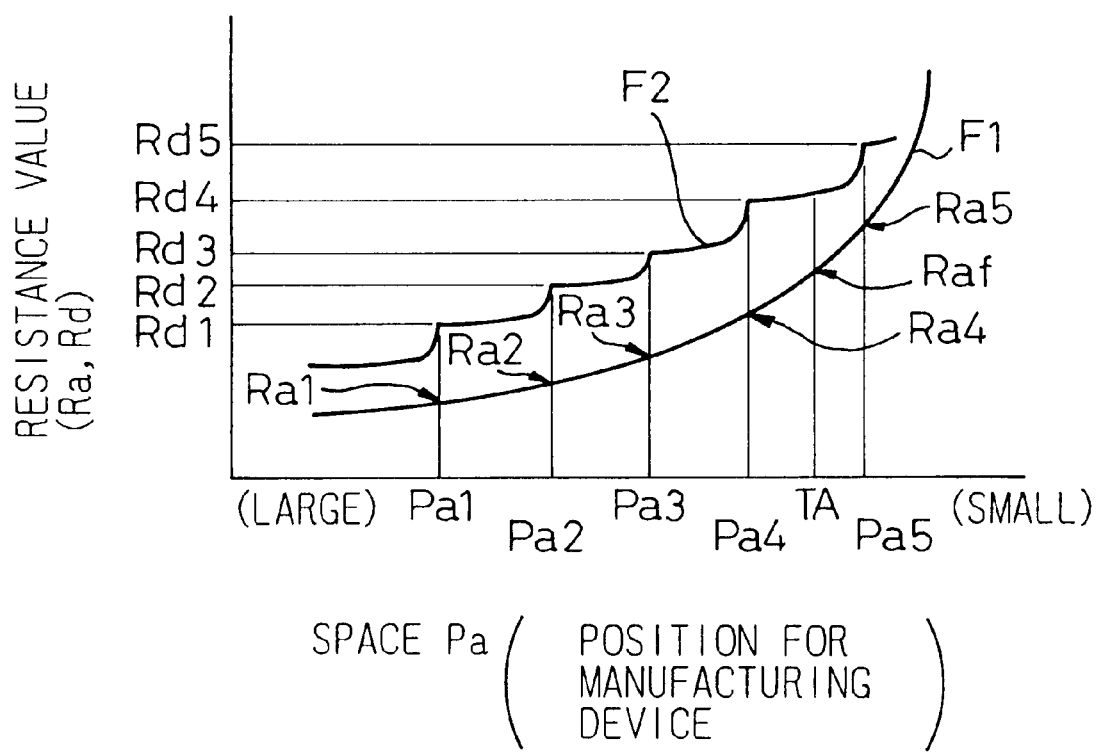
FIG. 7 is a drawing which shows the change in analog resistance value and the change in digital resistance value with respect to the element height machining position.

FIG. 7 is a drawing which shows the change (approximate) in the analog resistance Ra and the change in the digital resistance value Rd with respect to the element height machining position (spacing Pa), curve F1 showing the analog resistance which is measured between terminals 48 and 49, and the curve F2 showing the digital resistance value Rd which is measured between terminals 49 and 50.

In a preferred embodiment of the present invention, by detecting a breakpoint in the change in the digital resistance value Rd of the resistance pattern 40, the stage of machining of the element height of a magnetoresistive head and/or the gap depth of a thin-film head can be known. Thus, for the purpose of achieving a further improvement in machining accuracy, it is important to accurately determine this breakpoint.

For this reason, it is effective to cause the breakpoint to appear prominently, for example, by selecting the initial values of RV1 through RV5 as approximately ⅓ the values of R1 through R5, considering the relationship between the values of R1 through R5 to the initial values of RV1 through RV5. A method of changing the size relationships between R1 through R5 and RV1 and RV5, is, for example, to form as an overlay onto the pattern part of the lapping surface P side as seen from the window 43, that is, the pattern parts which form RV1 through RV5 (the hatched parts in FIG. 4) a resistance decreasing layer of a low-resistance material, so as to reduce RV1 through RV5. If the lateral width of the resistance decreasing layer is formed so as to be slightly smaller that the lateral width of the windows 43 through 47, at the point at which the machining progresses to the frame part on the lapping surface P side of each of the windows 43 to 47, even if the resistance decreasing layer remains, RV1 through RV5 will not be influenced by this and will become zero.

Methods to determine the timing of the occurrence of a breakpoint from a signal which indicates the digital resistance value Rd include: <1> a method of monitoring the level of the digital resistance value Rd at a fixed interval (for example, at a time interval during which less than 0.1 μm of lapping occurs), and determining the timing of the occurrence of a breakpoint as the point at which a large change in Rd occurs; and <2> a method of differentiating a signal which indicates the digital resistance value Rd, and determining the timing of the occurrence of a breakpoint from the point in time at which a peak occurs in this differentiated signal. Regardless of which method is used, it is possible to accurately determine the breakpoint.

The resistance monitoring pattern much be in a precise positional relationship with the magnetic head (magnetoresistive head and/or thin-film head). For this reason, in addition to growing the resistance monitoring pattern in the same process step as the magnetoresistive element formation in the wafer process, it is desirable that patterning be done using one and the same mask and one and the same process as the magnetoresistive element, for example, so that the pattern accuracy is the same as that of the actual magnetoresistive head elements or the like.

To grow the film for the above-noted resistance decreasing layer, an insulating layer can be grown on the area of the resistance monitoring pattern other than the resistance decreasing layer, over which a resistance decreasing layer can be sputtered or plated. The pattern of this resistance decreasing layer is not limited to the pattern shown in FIG. 4, it being possible to continuously form a resistance decreasing layer, a shown in FIG. 8, corresponding to each of the windows 43 through 47. By doing this, pattern formation of the resistance decreasing layer is facilitated.

In the case in which a compound recording/reproducing magnetic head in which a thin-film recording head is laminated onto a reproducing magnetoresistive head which is used as the magnetic head, it is possible to form the resistance monitoring pattern simultaneously with the formation of the magnetoresistive element section, using the same material as the magnetoresistive element, an upper shielding layer being formed as the resistance decreasing layer between the magnetoresistive head and the thin-film head. FIG. 9A through FIG. 9K show the fabrication processes used in this case.

In these fabrication processes, the substrate protecting layer is first formed on a substrate 71 (FIG. 9A), over which a lower shielding layer 73 made of NiFe or the like, and then an insulating layer 74 made of $Al_2O_3$ are formed, in this sequence (FIG. 9B and FIG. 9C). Next, the magnetoresistive element section 75 is formed on top of the insulating layer 74 (FIG. 9D). If the configuration is one that is made with an AMR head as the magnetoresistive head 75, a soft adjacent layer, a non-magnetic center layer made of Ta or the like, a magnetoresistive layer made of NiFe or the like, and a BCS layer made of FeMn or the like would be formed in that sequence on the insulating layer 74. In this example, the pattern 75A is formed in one and the same process, this being used as a resistance monitoring pattern.

A pair of terminals 76, with a spacing that corresponds to the recording track width, is formed on the magnetoresistive element section 75 for the purpose of supplying a sense current. The terminal 76A, which is used to detect the analog resistance value and the digital resistance value is formed at the same time (FIG. 9E). In addition, a non-magnetic insulating layer 77 is formed on the magnetoresistive element section 75 and the terminal 76 (FIG. 9F), over which is formed a thin-film head, to be described later.

First, an upper shielding layer (lower magnetic pole) 78 is formed from NiFe or the like. A part 78A of this upper shielding layer 78 is also formed on top of the pattern 75A (FIG. 9G), and the part 78A forms the above-described resistance decreasing layer. Next, the gap layer 79 of the thin-film head is formed (FIG. 9H), as are the coil (not shown in FIG. 10), and the upper magnetic pole 80, which is made of NiFe or the like (FIG. 9I). Then, after forming the terminals for the magnetic head and for resistance monitoring (FIG. 9J), a protecting layer 82 made of $Al_2O_3$ or the like is formed on the outside for the purpose of covering the surface of the thin-film head (FIG. 9K). The above-noted operations complete the fabrication process for pattern formation as shown in FIG. 9A through FIG. 9K.

It is necessary to measure before hand a dimension of the resistance monitoring pattern (for example, the spacing Pa=Pa1, Pa2, Pa3, Pa4, and Pa5 between the breakpoint occurrence points and the measuring reference line as shown in FIG. 4 or in the case of a magnetoresistive head, the spacing σ between the edge on the side opposite between the lapping surface P of the magnetoresistive element section 51 and the measuring reference line). It is desirable from the standpoint of performing an accurate measurement that this measurement be performed during the wafer process (for example, immediately after the formation of the magnetoresistive element section 51 and the resistance monitoring pattern 40). This measurement can be performed with regard to all blocks of the wafer, but can also be performed with regard to a representative block, the thus-made measurement value being usable as the measurement value for nearby blocks.

In the present invention, machining is performed of the element height of a magnetoresistive head and/or of the gap depth of a thin-film head, using a resistance monitoring pattern such as described above. Next, a method of establishing the timing of stopping the machining which reduces the element height, using the above-noted resistance monitoring pattern 40 will be described, with reference being made to the flowchart of FIG. 10.

(A) First Method of Using the First and Second Resistance Patterns 41 and 42

In the above-described FIG. 4, as the machining in the direction that reduces the element height of the magnetoresistive head by using a lapping board progresses (steps S10 and S11), the resistance monitoring pattern 40 which is formed at the time of the wafer process is also lapped away, resulting in a reduction in the surface area of the resistance pattern 41 and resistance pattern 42. Then, as the machining progresses up to the frame part on the lapping surface P side of the window 43 of the resistance pattern 42, when the spacing Pa between the breakpoint occurrence point and the measuring reference line is decreased to Pa1, a breakpoint occurs at the digital resistance (DR) Rd=Rd1, as shown in FIG. 7. This breakpoint is then detected, and the analog resistance (AR) Ra=Ra1 in the resistance pattern 41 at the point of the occurrence of this breakpoint is detected (step S12).

Additionally, as the machining progresses up to the frame part of the lapping surface P side of the window 44 of the resistance pattern 42, when the spacing Pa between the breakpoint occurrence point and the measuring reference line is decreased to Pa2, a breakpoint occurs at the digital resistance (DR) Rd=Rd2, the analog resistance (AR) Ra=Ra2 (step S13) at the point of the occurrence of this breakpoint being detected (step S14). Thereafter, in the same manner, when the spacing Pa between the breakpoint occurrence position and the measuring reference line becomes Pa3, Pa4, and so on (step S14), each time the breakpoint occurs (digital resistance value Rd=Rd3, Rd4, and so on), the analog resistance values Ra=Ra3, Ra4, and so on at the respective breakpoints are detected (step S16).

When three breakpoints are detected, the analog resistance values Ra at these breakpoints are used to predict the second-order curve of the relationship between the element height machining position (spacing Pa between the breakpoint occurrence position and the measuring reference line) and the analog resistance value Ra is predicted (step S15).

That is, the analog resistance Ra is hypothesized to be $Ra = A \cdot Pa^2 + B \cdot Pa + C$ (where A, B, and C are constants), the actually measured values of Ra=Ra1 when Pa=Pa1, Ra=Ra2 when Pa=Pa2, and Ra=Ra3 when Pa=Pa3 being substituted into this equation. From three equations relating the values of A, B, and C obtained by these numerical substitutions, the specific values of A, B, and C are determined, thereby establishing the second-order equation $Ra = A \cdot Pa^2 + B \cdot Pa + C$.

Next, the target value TA (the sum of the target element height MRh an the above-noted spacing σ) of the spacing between the machining finishing position and the measuring reference line is substituted into Pa in the above-noted predicted second-order equation, and the analog resistance value Rf=Rf3 at the target value TA is calculated. Machining is continued in this interval as well. In this example, the next breakpoint occurs when the spacing Pa between the breakpoint occurrence point and the measuring reference line is Pa4. After detecting the analog resistance value Ra=Raf at the point in time at which that breakpoint occurs, to obtain the latest second-order equation, the substitution of Ra=Ra2 when the measured value is Pa=Pa2, Ra=Ra3 when the measured value is Pa=Pa3, and Ra=Ra4 when the measured value is Pa=Pa4 is made into the second-order equation $Ra = A \cdot Pa^2 + B \cdot Pa + C$ (step S17).

From the three equations relating the A, B, and C obtained by means of the substitution of the new values, the specific values of A, B, and C are obtained, a new second-order equation $Ra = A \cdot Pa^2 + B \cdot Pa + C$ is established, the target value TA of the spacing between the machining finishing position and the measuring reference line is substituted into Pa in the updated second-order equation, the new analog resistance value Raf=Rf4 at the target value of TA being calculated.

If the actually measured value Rax of the resistance pattern 41 reaches R4f while observing whether or not the measured value of the first resistance pattern 41 has reached the calculated resistance value Rf4, simultaneously with the reaching of this value, the machining which reduces the element height in the machining process step is stopped (step S21).

In this example, during the recalculation of a new analog resistance value Rf4, it might happen that the actually measured value of resistance Rax of the first resistance pattern 41 reaches the analog resistance value Rf3. In this case, the machining is stopped at the point in time at which Rf3 is reached (step S18). If, as a result of determining by recalculating a new value of analog resistance Rf4, the new resistance value Rf4 is smaller than the previous value of Rf3, and the actual measured value of Rax of the first resistance pattern 41 already exceeds the new analog resistance value Rf4 at the point at which the new analog resistance value Rf4 is recalculated, the machining is stopped at the point in time at which the actual measured value Rax of the first resistance pattern 41 reaches the previous analog resistance value Rf3 (step S22) (and it is also possible to stop machining immediately).

According to the above-noted determination method, it is possible to establish the timing of stopping the machining without the influence of variation in resistance pattern film thickness or resistivity. Furthermore, because it is possible to perform fine prediction of the timing at which the target amount of machining is reached, from the resistance value of the first resistance pattern 41, it is possible not only to perform accurate machining as prescribed, but also to automate the process.

(B) Second Method of Using the First and Second Resistance Patterns 41 and 42

Figure 11:
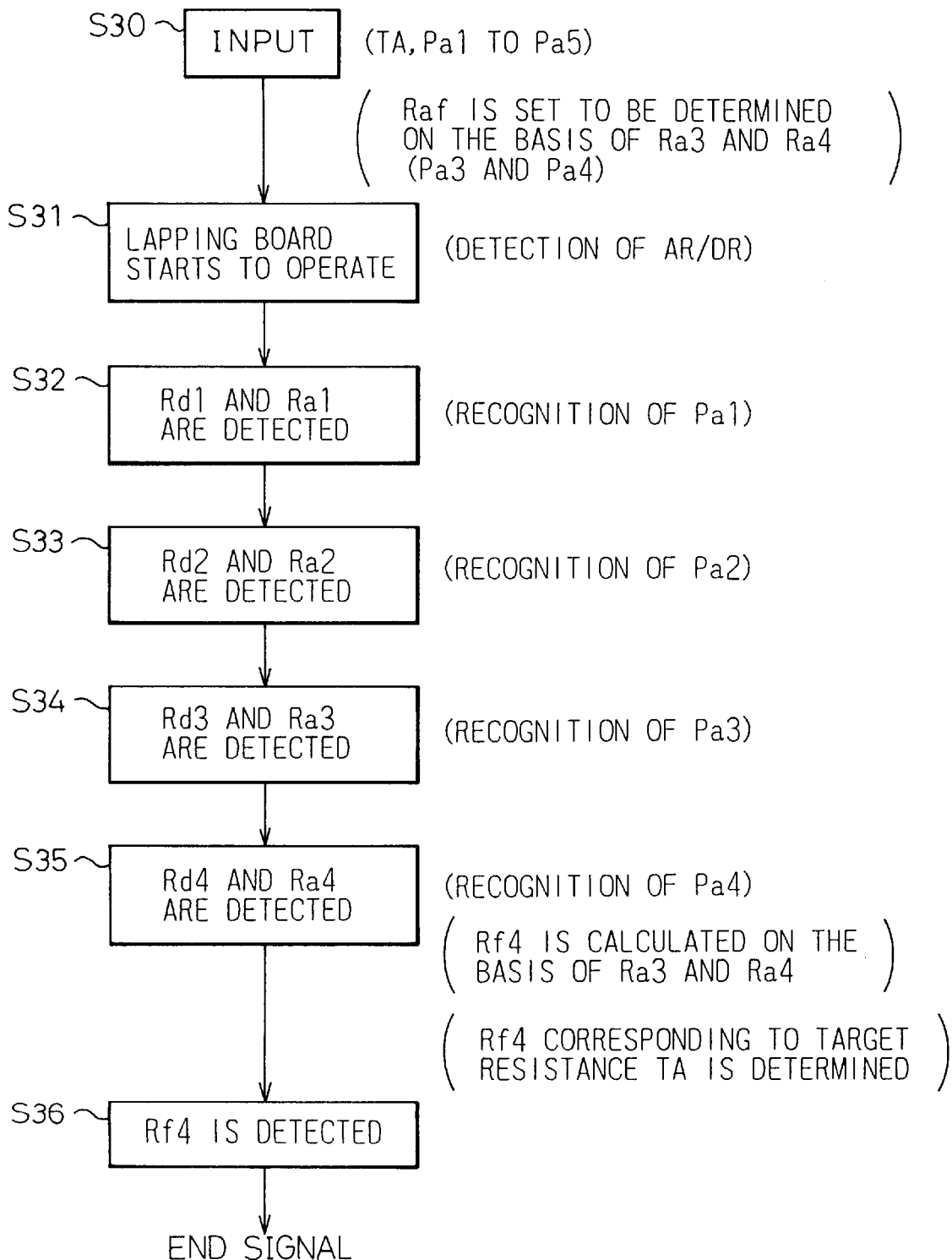
FIG. 11 is a flowchart which shows another procedure of determining the timing of stopping the machining in the direction that decreases the element height of the magnetic head according to the present invention.

While it is desirable, in performing precise machining, that the change in the analog resistance value be approximated to an order of two or greater, if the spacing of the breakpoints is close, it is possible to perform precise machining even using an approximation of $Ra = B \cdot Pa + C$ between two points. FIG. 11 shows the procedure for establishing the timing of the stopping of machining in this type of machining. In this case, Ra=Ra2 is substituted into the above-noted equation when the actual measured value Pa=Pa2 and Ra=Ra3 is substituted into the above-noted equation when the actual measured value Pa=Pa3 (steps S30 and S31), and from the two equations relating the thus obtained values of B and C, the specific values of B and C are obtained, these values establishing the straight line $Ra = B \cdot Pa + C$ (step S32).

Next, the target value TA spacing between the machining finishing position and the measuring reference line is substituted into PA in this predicted first-order equation, and the value of analog resistance Raf=Rf3 at the target value TA is calculated (step S35). The machining is continued during this period of time. When the next breakpoint occurs at the point at which the spacing Pa between the breakpoint occurrence position and the measuring reference line is equal to Pa4, after detecting the analog resistance value Ra=Ra4 at the point in time when this breakpoint occurs, to obtain the newest straight line, the value of Ra=Ra3 when the actual measured value Pa is Pa3, and the value of Ra=Ra4 when the actual measured value Pa is Pa4 is substituted into the straight line equation Ra=B·Pa+C. Then, from the two equations which relate the B and C which were obtained the substitution of new values, specific values of B and C are determined, these value establishing the new straight line Ra=B·Pa+C, after which the target value TA of the spacing between the machining finishing position and the measuring reference line is substituted into the Pa of this new first-order equation, and the analog resistance value Raf=Rf4 at this target value TA is calculated (step S35). The method of using the analog resistance values Rf3 and Rf4 is exactly the same as in the case of a second-order curve.

To simplify the judgment, there is also a method in which only Rf4 is determined, this being the only criterion used in the judgment. In this case, at the detection of the fourth breakpoint, Rf4 is calculated, and when the actual measured value of analog resistance exceeds this, the machining is stopped (step S36).

(C) Method of Using the Second Resistance Pattern 42

Figure 12:
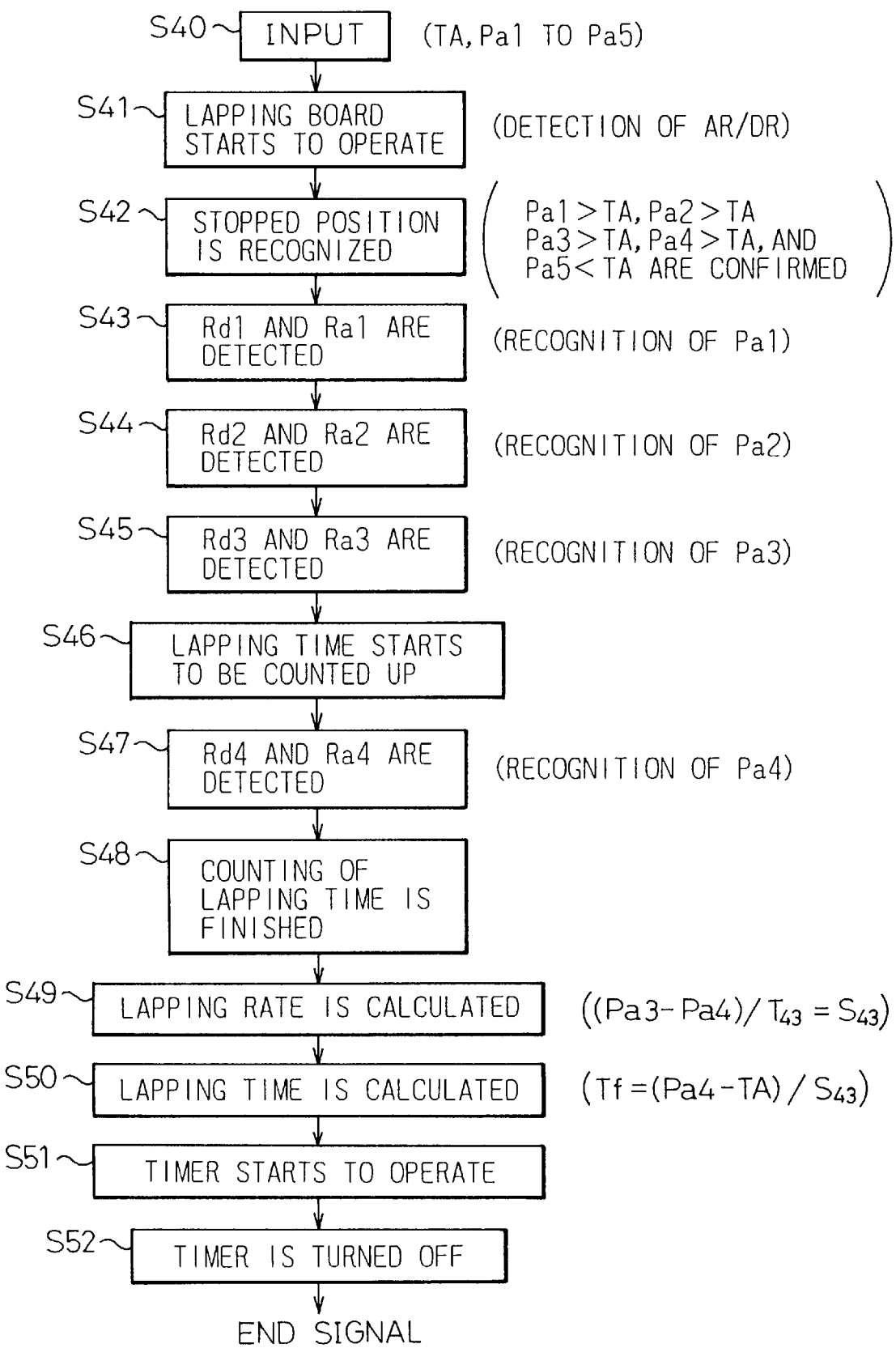
FIG. 12 is a flowchart which shows yet another procedure of determining the timing of stopping the machining in the direction that decreases the element height of the magnetic head according to the present invention.

It is also possible to establish the timing of stopping of the machining using only the second resistance pattern 42. FIG. 12 shows the procedure for establishing the timing of the stopping of machining in this type of machining.

In this method, the machining speed in a machining region before the point at which the target value of element height is reached within a machining region that is delineated by the machining position at which the resistance value of the resistance pattern 42 exhibits a breakpoint is determined, and from this speed the amount of time required to reach the target element height is calculated, the machining being stopped simultaneously with the elapse of this amount of time.

Specifically, as the machining in the direction of reducing the element height of the magnetoresistive head progresses (steps S40 and S41), the resistance monitoring pattern 40 which had been formed during the wafer process is also machined away, and the surface areas of the resistance pattern 41 and the resistance pattern 42 decrease (step S42). Then the machining reaches the frame part on the lapping surface P side of the window 43 of the resistance pattern 42, so that when the spacing between the breakpoint occurrence position and the measuring reference line is reduced to Pa1, a breakpoint occurs at the point at which Rd=Rd1 (step S43).

Next, the machining progresses up to the frame part on the lapping surface P side of the window 44 of the resistance pattern 42, and when the spacing Pa between the breakpoint occurrence position and the measuring reference line is reduced to Pa2, a breakpoint occurs at point at which the digital resistance value Rd is equal to Rd2 (step S44). Then, the machining proceeds up to the frame part on the lapping surface P side of the window 45 of the resistance pattern 42, and when the spacing Pa between the breakpoint occurrence position and the measuring reference line is reduced to Pa3, a breakpoint occurs at point at which the digital resistance value Rd is equal to Rd3 (step S45). When it is recognized that the spacing Pa between this breakpoint occurrence position and the measuring reference line has become Pa3, counting of the lapping time is started.

Then, as the machining progresses up to the frame part on the lapping surface side P of the window 46 of the resistance pattern 42, when the spacing Pa between the breakpoint occurrence position and the measuring reference line becomes Pa4, a breakpoint occurrences at the point at which the digital resistance value Rd is equal to Rd4 (Step S47). When recognition is made that the spacing Pa between this breakpoint occurrence position and the measuring reference line has become Pa4, counting of the lapping time is stopped (step S45). The time which is counted in this manner is the lapping time $T_{43}$ within the machining region delineated by the breakpoint in the resistance value change of the resistance pattern 42 one machining region before reaching the target element height.

Next, the lapping speed is calculated as $S_{43}$=(Pa3−Pa4)/$T_{43}$ (step S49). Because the lapping speed within the region in which the target element height value is reached can also be treated as being approximately equal to the machining speed $S_{43}$, in addition to calculating (step S50) the amount of time Tf (Pa4=TA)/S to reach the target value of spacing between the machining finishing position and the measuring reference line (the sum of the target element height MRh and the above-noted spacing σ), a timer is set so that the machining is stopped when this amount of time Tf has elapsed (step S51). After the time Tf elapses, the machining is stopped (step S52). If this time Tf has already elapsed At the point in time at which the time Tf is determined by calculation, machining is stopped immediately.

In the above determination method as well, it is possible to establish the timing of the stopping of the machining without being influenced by variation in the film thickness and resistivity of the resistance pattern. Furthermore, because it is possible to predict the time to reach the target value in stopping the machining, it is possible not only to precisely machine to the target element height, but also to automate the process.

Figure 13:
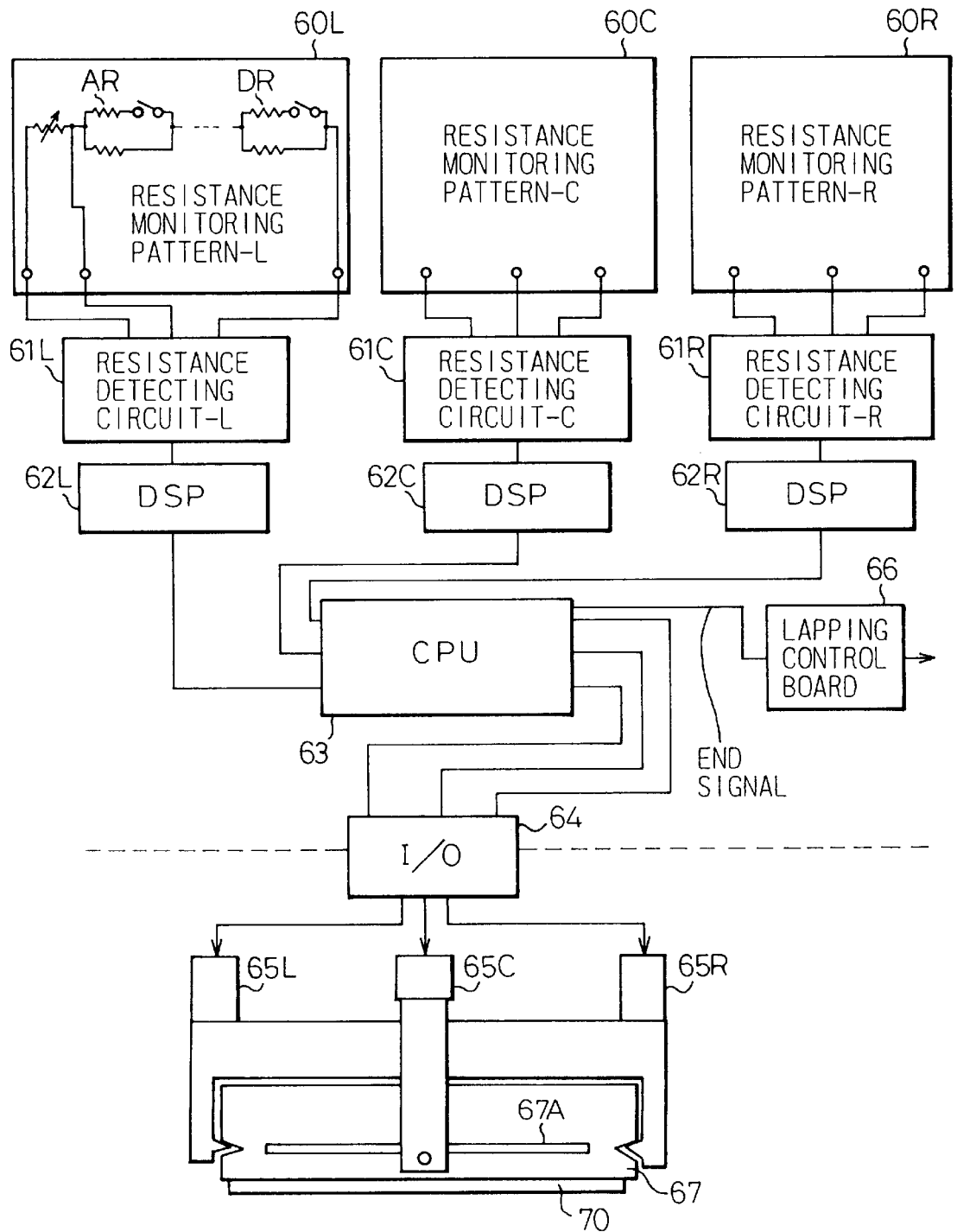
FIG. 13 is a drawing which shows the configuration in the case of pressing a block onto a lapping board and processing it therewith, while performing independent control of the lapping pressure at three locations.

While the above-noted description is for the case in which control of machining is performed using one resistance pattern, in the case of machining a block by lapping, it is desirable, as described above, to apply pressure to the lapping board while performing independent control at a total of three points, these being both ends of the block and the center part of the block, based on the resistance values of resistance patterns for the purpose of monitoring machining. FIG. 13 shows the configuration of machining in this case, with the block being pressed up against the lapping board as independent control of the lapping pressure is performed at three locations.

In FIG. 13, the resistance monitoring patterns 60L, 60C, an 60R all have exactly the same configuration as the above-noted resistance monitoring pattern 40, these being formed at the left end, the center, and the right end of the block 70 which is being machined. The resistance detecting circuits 61L, 61C, and 61R are circuits which detect the analog resistance values and digital resistance values of the resistance monitoring patterns 60L, 60C, an 60R, respectively, these making contact with the terminals of the resistance monitoring patterns 60L, 60C, an 60R. The digital signal processors 62L, 62C, and 62R remove noise and abnormal values from signals related to the analog resistance values and digital resistance values of the resistance monitoring patterns 60L, 60C, an 60R, convert these to digital data, and send them to the central processing unit (CPU) 63.

The digital signal processors 62L, 62C, and 62R, for example, take a plurality of samples of the output signals of the resistance detecting circuits 61L, 61C, and 61R over a given period of time, and output the average values of the analog resistance values and digital resistance values. because the output signals from the resistance detecting circuits 61L, 61C, and 61R contain noise due to the influence of lapping compound, mechanical noise, and electrical noise, after sampling the output signals of the resistance detecting circuits 61L, 61C, and 61R and A/D converting them, they are passed through a bandpass filter (digital filter), after which a prescribed number of sampled data are removed from the maximum-value end and minimum-value end of the digital data thereof, an average being taken of the remaining data, which is then output.

The central processing unit (CPU) 63 reads in each of the output data of the digital signal processors (DSPs) 62L, 62C, and 62R, these being output, via an input/output device (I/O) 64 to pressure generating mechanisms 65L, 65C, and 65R as the target values of lapping pressure at the left end, center, and right end of the block 70. When the machining is stopped, an end signal is output to the lapping control board 66.

The block 70 is affixed to the bottom surface of a holding fixture 67, and is pressed against the lapping board thereby so as to be lapped. The holding fixture 67 is held at its left end and right end by a bifurcated holding fork 68. The above-noted pressure generating mechanisms 65L, 65C, and 65R generate a pressing force by means of a piezoelectric device, an air cylinder, or a stepping motor or the like, the pressure generating mechanism 65L pressing the left end of the block 70 to the lapping board via the left end of the holding fixture 67, the pressure generating mechanism 65R pressing the right end of the block 70 to the lapping board via the right end of the holding fixture 67, and the pressure generating mechanism 65C pressing a part of the center of the block 70 (left part) lower than the slit 67A of the holding fixture 67 to the lapping board. The pressure generating mechanism 65C causes part of the holding fixture 67 to bend, thus pressing the center part of the block 70 against the lapping board.

In the block 70, there exists a dimensional difference between the left and right end, caused by the variations in the cut dimensions, and non-uniformities at the center part, caused by variation in condition of mounting to the holding fixture 67. In actual machining, at first the pressure generating mechanisms 65L, 65C, and 65R are independently driven, individual control being performed of the lapping pressure at the left end, center, and right end of the block 70, work proceeding in accordance with the timing of the occurrence of breakpoints in the digital resistance values obtained from the resistance monitoring patterns 60L, 60C, and 60R.

For example, in the case of using a resistance monitoring pattern such as described above, which has five breakpoints, because there is a target value between the fourth and the fifth breakpoints, it is necessary to finish the timing adjustment of the breakpoint occurrence at least before occurrence of the fourth breakpoint. Specifically, it is necessary to perform control of the lapping pressures at the left end, center, and right end of the block 70 so that at first coarse adjustment up until the occurrence of the second breakpoint is performed, and, based on this data, a fine adjustment up until the occurrence of the third breakpoint is performed, after which the entire surface is machined uniformly.

The actually spacing Pa between the breakpoint occurrence position and the measuring reference line and the actual measured value of the analog resistance Pa differ between the left end, center, and right end of the block 70, and in substituting into the above-described approximation equation, the average of the values for the left end, center, and right end is used. Therefore, for the example of the signal which stops the machining, at the point at which the average value of the analog resistance Ra of the left end, center, and right end reaches the average value of the target value of the left end, center, and right end, the END signal is output from the central processing unit 63 to the lapping control board 66.

While the above description is in the case in which there are five breakpoints, there is no need to have this limitation.

Additionally, although the above-noted description is for the example of the element height of a magnetoresistive head, this can be applied in exactly the same manner to machining to a prescribed value of gap depth in the case of a thin-film head.

As described above, as a first feature of a preferred embodiment of the present invention, in the first invention which is related to a fabrication method of a magnetic head which includes a magnetoresistive head, as machining in the direction which reduces the element height of the magnetoresistive head progresses, the surface area of the first resistance pattern decreases nearly linearly, and the surface area of the second resistance pattern decreases in nearly piecewise linear manner. With the position at which the change in the surface area of the second resistance pattern exhibits a breakpoint being known, whether or not the machining has reached that position can be easily and accurately known by detecting the generation of a breakpoint in the change of the resistance value.

Thus, by relating the occurrence of a breakpoint in the change in resistance value of the second resistance pattern with the resistance value of the first resistance pattern at the time that breakpoint occurs, it is possible to establish the timing of the ending of the machining that reduces the element height based on the resistance value of the first resistance pattern. By doing this, it is possible not only to precisely machine the element height of the magnetoresistive head to a prescribed value free from the influence of variation in film thickness and resistivity of the resistance pattern, but also to enable automation of the process.

In particular, the first resistance pattern resistance value at the time of occurrence of a breakpoint in the change of the resistance value of the second resistance pattern is determined for at least three breakpoints, the resistance value at these three breakpoints being used to predict the second-order curve of the relationship between the machining position of the element height of the magnetoresistive head and the resistance value of the first resistance pattern, the resistance value of the first resistance pattern at the target element height being calculated based on the thus-predicted second-order curve, the machining which reduces the element height being stopped almost simultaneously with the timing in which the actually measured resistance value of the first resistance pattern reaches this calculated resistance value, thereby enabling precise machining.

As a second feature of a preferred embodiment of the present invention, as machining in the direction which reduces the gap depth of a thin-film head progresses, the surface area of the first resistance pattern decreases nearly linearly, and the surface area of the second resistance pattern decreases in nearly piecewise linear manner. With the position at which the change in the surface area of the second resistance pattern exhibits a breakpoint being known, whether or not the machining has reached that position can be easily and accurately known by detecting the generation of a breakpoint in the change of the resistance value.

Thus, by relating the occurrence of a breakpoint in the change in resistance value of the second resistance pattern with the resistance value of the first resistance pattern at the time that breakpoint occurs, it is possible to establish the timing of the ending of the machining that reduces the gap depth based on the resistance value of the first resistance pattern. By doing this, it is possible not only to precisely machine the gap depth of the thin-film head to a prescribed value free from the influence of variation in film thickness and resistivity of the resistance pattern, but also to enable automation of the process.

In particular, the first resistance pattern resistance value at the time of occurrence of a breakpoint in the change of the resistance value of the second resistance pattern is determined for at least three breakpoints, the resistance value at these three breakpoints being used to predict the second-order curve of the relationship between the machining position of the gap depth of the thin-film head and the resistance value of the first resistance pattern, the resistance value of the first resistance pattern at the target gap-depth being calculated based on the thus-predicted second-order curve, the machining which reduces the element height being stopped almost simultaneously with the timing at which the actually measured resistance value of the first resistance pattern reaches this calculated resistance value, thereby enabling precise machining.

As a third feature of a preferred embodiment of the present invention, as machining in the direction which reduces the element height of a magnetoresistive head progresses, the surface area of the first resistance pattern decreases nearly linearly, and the surface area of the second resistance pattern decreases in nearly piecewise linear manner. With the position at which the change in the surface area of the second resistance pattern exhibits a breakpoint being known, whether or not the machining has reached that position can be easily and accurately known by detecting the generation of a breakpoint in the change of the resistance value.

Thus, the machining speed in a machining region before the point at which the target value of magnetoresistive element height is reached within a machining region that is delineated by the machining position at which the resistance value of the above-noted resistance pattern exhibits a breakpoint is determined, and from this speed the amount of time required to reach the target element height is calculated. By doing this, it is possible not only to precisely machine the element height of the magnetoresistive head to a prescribed value free from the influence of variation in film thickness and resistivity of the resistance pattern, but also to enable automation of the process.

According to the fourth invention which is related to a fabrication method for a magnetic head which includes a thin-film head, as machining in the direction which reduces the gap depth of the thin-film head progresses, the surface area of the first resistance pattern decreases nearly linearly, while the surface area of the second resistance pattern decreases nearly in a piecewise linear manner. With the position at which the change in the surface area of the second resistance pattern exhibits a breakpoint being known, whether or not the machining has reached that position can be easily and accurately known by detecting the generation of a breakpoint in the change of the resistance value, because the breakpoint in surface area appears as a breakpoint in the change in resistance value.

Thus, the machining speed in a machining region before the point at which the target value of thin-film head gap depth is reached within a machining region that is delineated by the machining position at which the resistance value of the above-noted resistance pattern exhibits a breakpoint is determined, and from this speed the amount of time required to reach the target gap depth is calculated. By doing this, it is possible not only to precisely machine the gap depth of the thin-film head to a prescribed value free from the influence of variation in film thickness and resistivity of the resistance pattern, but also to enable automation of the process.

In summary, in each of the above-described embodiments, it is possible to achieve a further improvement in machining precision by providing a resistance monitoring pattern at each end of the block.

I claim:

1. A method for fabricating a magnetic head comprising steps of:

forming on a wafer a plurality of magnetic heads, which each include at least one magnetoresistive head, in a two dimensional arrangement;

cutting from the wafer a block on which a plurality of magnetic heads are arranged in a straight line;

machining to a prescribed height a magnetoresistive head section of said magnetic heads as a block; and dividing the already machined block into individual magnetic heads;

wherein a resistance monitoring pattern for the monitoring of element height machining, comprising a first resistance pattern, the surface area of which decreases nearly linearly as machining proceeds in a direction that reduces the element height of the magnetoresistive head, and a second resistance pattern the surface area of which decreases nearly in a piecewise linear manner as machining proceeds in the direction that reduces the element height of the magnetoresistive head, is formed on the wafer block at the time of said forming step, and wherein the timing of the completion of machining is determined based on the resistance value of said resistance monitoring pattern;

wherein the resistance value of said first resistance pattern at the point in time at which a breakpoint occurs in the resistance value of said second resistance pattern is determined for at least a plurality of breakpoints, and wherein, from said plurality of resistance values, a relationship between an element height machining position of said magnetoresistive head and the resistance value of said first resistance pattern is predicted, the timing of the stopping of said machining which reduces the element height being established based on said relationship; and further wherein a resistance value of said first resistance pattern at the point in time at which a breakpoint occurs in the change in resistance value of said second resistance pattern is determined for at least three breakpoints, and wherein a second-order curve of a relationship between the element height machining position of said magnetoresistive head and the resistance value of said first resistance pattern is predicted, a resistance value of said first resistance pattern at the target element height is determined based on the predicted second-order curve, machining of said machining step which reduces the element height is stopped nearly simultaneously with the reaching by an actually measured value of said first resistance pattern of said calculated resistance value.

2. The method for fabricating a magnetic head according to claim 1, wherein said magnetic head is a compound magnetic head in which a thin-film recording head is laminated onto a reproducing magnetoresistive head.

3. The method for fabricating a magnetic head according to claim 1, wherein said resistance monitoring pattern is provided at both ends and at a center part of the block.

4. A method for fabricating a magnetic head comprising steps of:

forming on a wafer a plurality of magnetic heads, which each include a thin-film head, in a two dimensional arrangement;

cutting from the wafer a block on which a plurality of magnetic heads are arranged in a straight line;

machining to a prescribed depth the gap of said thin-film heads as a block; and dividing the already machined block into individual magnetic heads;

wherein a resistance monitoring pattern for monitoring of gap depth machining, comprising a first resistance pattern, the surface area of which decreases nearly linearly as machining proceeds in a direction that reduces the gap depth of the thin-film head, and a second resistance pattern, the surface area of which decreases nearly in a piecewise linear manner as machining proceeds in the direction that reduces the element height of the thin-film head, is formed on the wafer block at the time of said forming step, and wherein the timing of the completion of machining which reduces the gap depth in said machining is determined based on the resistance monitoring pattern;

wherein the resistance value of said first resistance pattern at the point in time at which a breakpoint occurs in the resistance value of said second resistance pattern is determined for at least a plurality of breakpoints, and wherein, from said plurality of resistance values, a relationship between a gap depth machining position of said thin-film head and the resistance value of said first resistance pattern is predicted, the timing of the stopping of said machining which reduces the gap depth is established based on said relationship; and further wherein a resistance value of said first resistance pattern at the point in time at which a breakpoint occurs in the change in resistance value of said second resistance pattern is determined for at least three breakpoints, and wherein a second-order curve of a relationship between the gap depth machining position of said thin-film head and the resistance value of said first resistance pattern is predicted, a resistance value of said first resistance pattern at the target gap depth is determined based on the predicted second-order curve, machining of said machining step which reduces the gap depth is stopped nearly simultaneously with the reaching by an actually measured value of said first resistance pattern of said calculated resistance value.

5. The method for fabricating a magnetic head according to claim 4, wherein said magnetic head is a compound magnetic head in which a thin-film recording head is laminated onto a reproducing magnetoresistive head.

6. The method for fabricating a magnetic head according to claim 4, wherein said resistance monitoring pattern is provided at both ends and at a center part of the block.

7. A method for fabricating a magnetic head comprising the steps of:

forming on a wafer a plurality of magnetic heads, which each include at least one magnetoresistive head, in a two dimensional arrangement;

cutting from the wafer a block on which a plurality of magnetic heads are arranged in a straight line;

machining to a prescribed height a magnetoresistive head section of said magnetic heads as a block; and dividing the already machined block into individual magnetic heads;

wherein a resistance monitoring pattern for monitoring magnetoresistive head element height machining comprising a resistance pattern having a surface area of which decreases in a nearly piecewise linear manner as machining proceeds in a direction that reduces the element height of the magnetoresistive head is formed on the wafer block at the time of said forming step, after which a determination is made, in said machining step, of the machining speed in a machining region before the point at which said target value of height of said magnetoresistive head is reached within a machining region that is delineated by the machining position at which the resistance value of said resistance pattern exhibits a breakpoint, the time required to reach said target element height being calculated from said machining speed, and machining which reduces said element height being stopped almost simultaneously with the passage of said amount of time.

8. The method for fabricating a magnetic head according to claim 7, wherein said magnetic head is a compound magnetic head in which a thin-film recording head is laminated onto a reproducing magnetoresistive head.

9. The method for fabricating a magnetic head according to claim 7, wherein said resistance monitoring pattern is provided at both ends and at a center part of the block.

10. The method for fabricating a magnetic head comprising steps of:

forming on a wafer a plurality of magnetic heads, which includes at least a thin-film head, in a two dimensional arrangement;

cutting from the wafer a block on which a plurality of magnetic heads are arranged in a straight line;

machining to a prescribed depth the gap of said thin-film heads as a block; and dividing the already machined block into individual thin-film heads;

wherein a resistance monitoring pattern for monitoring thin-film head gap length machining, said monitoring pattern comprising a resistance pattern having a surface area of which decreases in a nearly piecewise linear manner as machining proceeds in the direction that reduces the gap depth of the thin-film head is formed on the wafer block at the time of said wafer process, after which a determination is made, in said machining step, of the machining speed in a machining region before the point at which said target value of gap depth of said thin-film head is reached within a machining region that is delineated by the machining position at which the resistance value of said resistance pattern exhibits a breakpoint, the time required to reach said target element height being calculated from said machining speed, and machining which reduces said gap depth being stopped almost simultaneously with the passage of said amount of time.

11. The method for fabricating a magnetic head according to claim 10, wherein said magnetic head is a compound magnetic head in which a thin-film recording head is laminated onto a reproducing magnetoresistive head.

12. The method for fabricating a magnetic head according to claim 11, wherein said resistance monitoring pattern is provided at both ends and at a center part of the block.

13. A method for fabricating a magnetic head comprising steps of:

forming on a wafer a plurality of magnetic heads, which each include at least one magnetoresistive head, in a two dimensional arrangement;

cutting from the wafer a block on which a plurality of magnetic heads are arranged in a straight line;

machining to a prescribed height a magnetoresistive head section of said magnetic heads as a block; and dividing the already machined block into individual magnetic heads;

wherein a resistance monitoring pattern for monitoring of element height machining, comprising a first resistance pattern, the surface area of which decreases nearly linearly as machining proceeds in a direction that reduces the element height of the magnetoresistive head, and a second resistance pattern the surface area of which decreases nearly in a piecewise linear manner as machining proceeds in the direction that reduces the element height of the magnetoresistive head, is formed on the wafer block at the time of said forming step, and wherein the timing of the completion of machining is determined based on the resistance value of said resistance monitoring pattern; and further wherein said second resistance pattern is formed by preparing groups of resistors, with each of said groups of resistors consisting of a plurality of resistors connected in parallel, and wherein each of said groups of resistors is connected in series.

14. A method for fabricating a magnetic head comprising steps of:

forming on a wafer a plurality of magnetic heads, which includes a thin-film head, in a two dimensional arrangement;

cutting from the wafer a block on which a plurality of magnetic heads are arranged in a straight line;

machining to a prescribed depth the gap of said thin-film heads as a block; and dividing the already machined block into individual magnetic heads;

wherein a resistance monitoring pattern for monitoring of gap depth machining, comprising a first resistance pattern, the surface area of which decreases nearly linearly as machining proceeds in the direction that reduces the gap depth of thin-film head, and a second resistance pattern, the surface area of which decreases nearly in a piecewise linear manner as machining proceeds in the direction that reduces the element height of the magnetoresistive head, is formed on the wafer block at the time of said forming step, and wherein the timing of the completion of machining which reduces the gap depth in said machining is determined based on the resistance monitoring pattern; and further wherein said second resistance pattern is formed by preparing groups of resistors, with each of said groups of resistors consisting of a plurality of resistors connected in parallel, and wherein each of said groups of resistors is connected in series.

* * * * *

UNITED STATES PATENT AND TRADEMARK OFFICE
CERTIFICATE OF CORRECTION

PATENT NO. : 5,913,550
DATED : June 22, 1999
INVENTOR(S) : Watanuki

It is certified that error appears in the above-indentified patent and that said Letters Patent is hereby corrected as shown below:

In Claim 10, line 1, delete "The" and insert

--A-- therefor.

Signed and Sealed this

Tenth Day of April, 2001

Attest:

NICHOLAS P. GODICI

Attesting Officer     Acting Director of the United States Patent and Trademark Office